Figure 1:
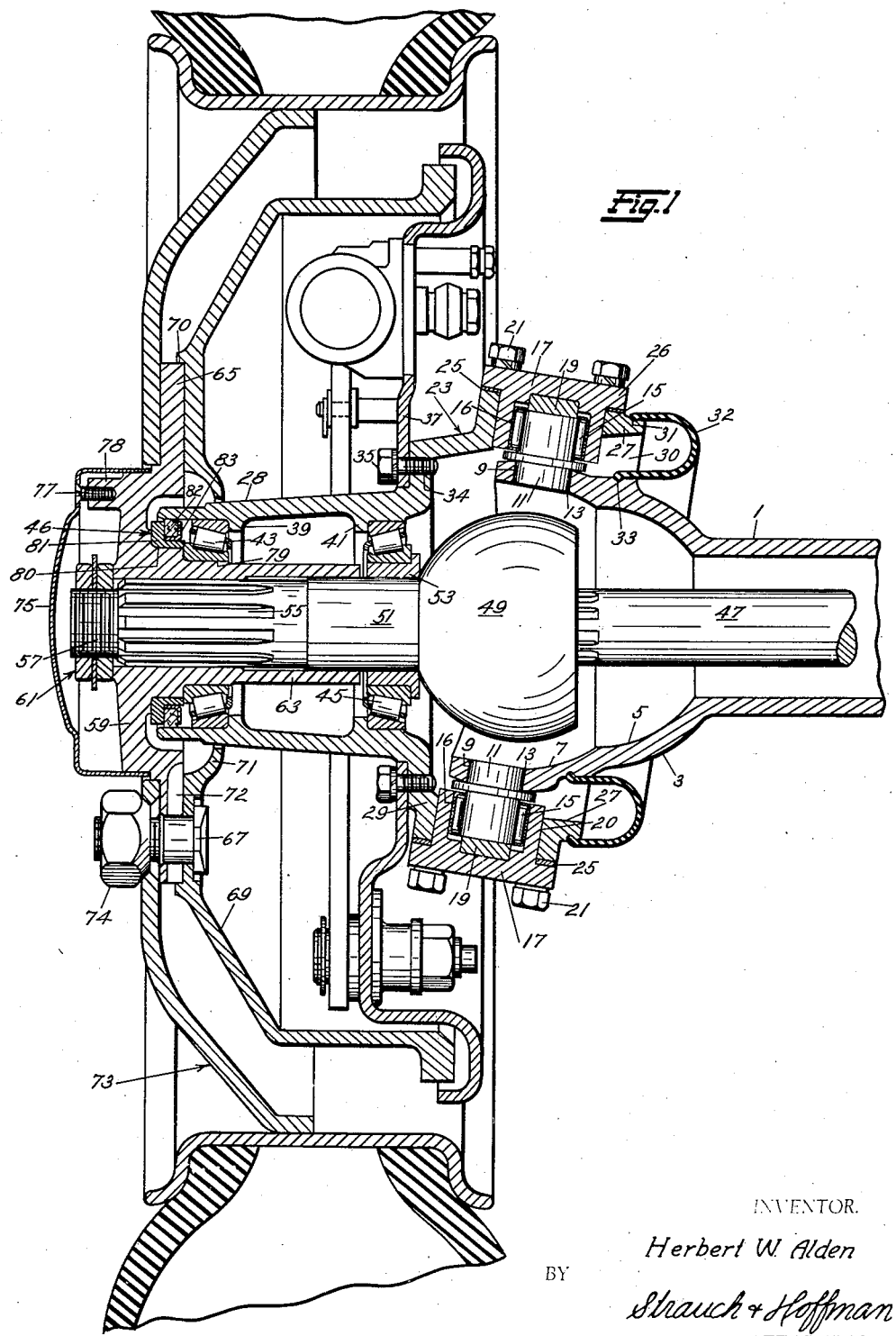

March 30, 1937. H. W. ALDEN 2,075,564
STEERING DRIVE AXLE
Filed May 17, 1935 2 Sheets-Sheet 1

INVENTOR.
Herbert W. Alden
BY
Strauch & Hoffman
ATTORNEYS

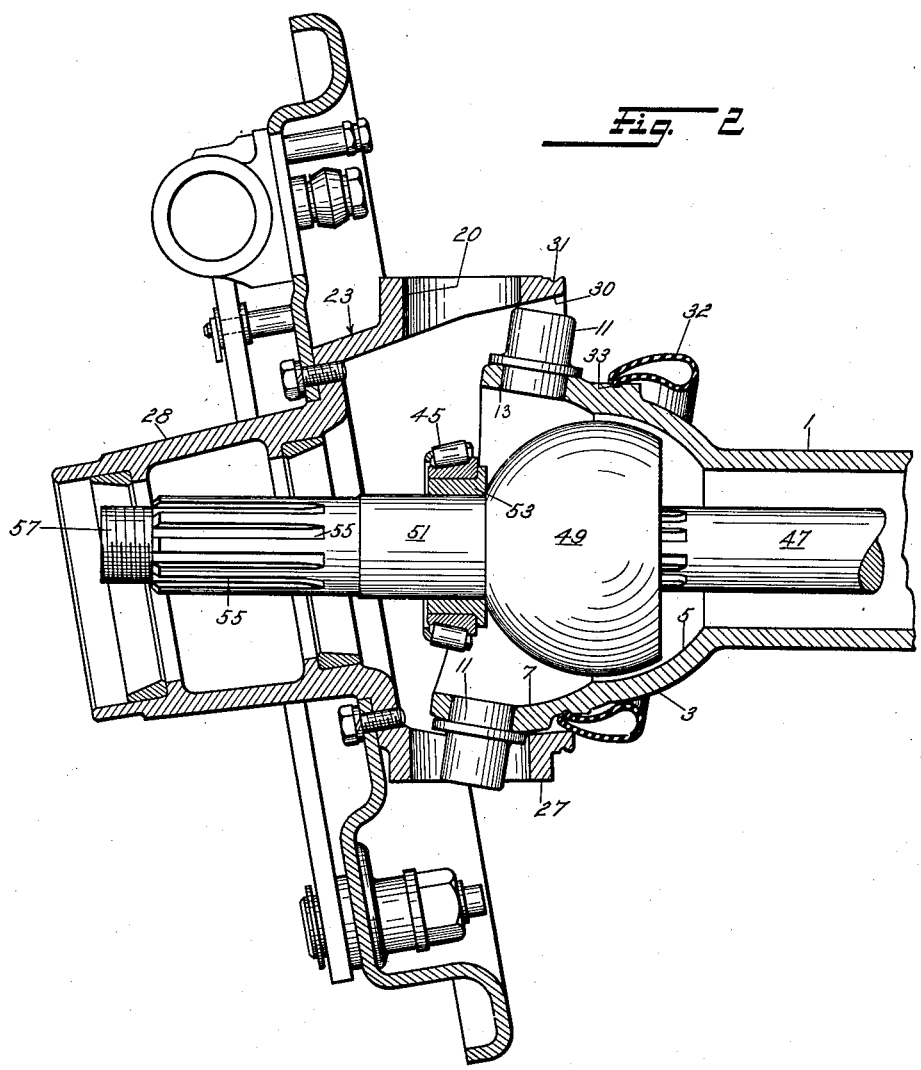

Patented Mar. 30, 1937

2,075,564

UNITED STATES PATENT OFFICE 2,075,564

STEERING DRIVE AXLE

Herbert W. Alden, Detroit, Mich., assignor to The
Timken-Detroit Axle Company, Detroit, Mich.,
a corporation of Ohio Application May 17, 1935, Serial No. 22,091

9 Claims. (Cl. 180—43)

This invention relates to wheel mountings for vehicles, and more particularly to a mounting for driven wheels and flexible driving connections, permitting dirigibility of the wheels. This application is closely related in some respects to my copending application Serial No. 745,482, filed September 25, 1934.

My above noted copending application discloses a one-piece universal joint outer housing member and a hub and wheel spindle construction which is simplified over prior designs. In a mechanism of the type disclosed in said application the steering trunnions usually are made an integral part of that housing member which is connected to the stationary axle of the vehicle, thus making it necessary to raise and tilt the one-piece housing member in order to clear the trunnions. A still greater simplification of the wheel and hub structure is desirable because the wheel spindle has had to be detached from the one-piece housing prior to removal of the latter. This is because, with such structures, it is necessary that the driving shafts and universal joints be in place before the universal joint housing is assembled, and because offsetting of the shafts and inter-connecting universal joint with respect to the longitudinal axis of the axle to permit raising or tilting of the outer housing member is impossible.

This difficulty is overcome in the present invention by providing for longitudinal displacement of the driving shafts and universal joint during assembly or dismantling, thus permitting the wheel driving end of the shaft to be dropped with respect to the wheel assembly; and hence the invention has for a primary object, the provision, in a steering drive axle outer end, of a longitudinally slidable universal joint to facilitate assembly of the joint housing and its attached parts. A related object of the present invention resides in the provision of a simplified wheel, hub and bearing construction.

The above-stated primary object of the present invention is accomplished by the provision of an extended recess in the inner universal joint housing member to permit longitudinal displacement of the universal joint during assembly of the outer universal joint housing and wheel bearing carrier.

A further object is to reduce the unsprung weight of a vehicle steering drive axle by the elimination of excess parts.

The wheel hub and bearing construction of prior art steering drive axles has, for the most part, included a wheel bearing spindle, a hub and a driving member for the hub and wheel. By the present invention one of these parts, namely the hub, is eliminated. In effect two are eliminated, for one of the two remaining parts in accordance with the present invention is made integral with the one-piece outer universal joint housing.

Therefore, a further primary object of this invention is to provide a wheel end construction for a steering drive axle comprising as essential parts thereof a one-piece outer universal joint housing and wheel bearing carrier member and a wheel driving member.

Another object of the present invention is to provide, in a wheel end construction for a steering drive axle, a novel wheel bearing arrangement wherein the bearings for the driven wheel are located within a pivotally mounted non-rotatable wheel spindle in a manner to facilitate assembly and disassembly.

A further object of the present invention is to provide, in a driven axle construction, a novel arrangement for excluding lubricant from the interior of the brake drum for the vehicle wheel brake.

Another object of my invention resides in the provision of new and improved sealing means for closing the inner side of the universal joint housing structure; and particularly, to provide a flexible seal that is quickly detachable from an outwardly removable housing member. This subject matter is carried forward from my above mentioned copending application.

A study of the following description in connection with the accompanying drawings will afford a clear conception of the foregoing objects and advantages of my invention and other and more specific objects will appear from the following disclosure and from the terms of the appended claims.

In the drawings:

Figure 1 is a vertical sectional view through the outer end of a driving steering axle constructed in accordance with the present invention; and Figure 2 is a sectional view similar to Figure 1 but with certain parts removed in order to clearly illustrate the method of assembly and disassembly of the essential or foundation parts of the device.

With continued reference to the drawings wherein like characters designate like parts wherever they occur, and with particular reference to Figure 1, numeral 1 indicates the load-carrying member, generally of tubular form and having the usual enlarged portion between its ends for housing the axle driving gearing (not shown). The load carrying member 1 terminates in enlarged substantially spherical-shaped portions 3, only one of which appears in the drawings. It will be noted upon inspection of Figure 1 that the interior of the end portion 3 comprises, in effect, two spherically curved portions 5 and 7, the one merging into the other. The reason for this will be evident hereinafter.

The end portion 3, which comprises the inner member of a universal joint housing, has diametrically opposite apertures 9 into which are press-fittedly inserted outwardly extending trunnions 11. The trunnions are substantially cylindrical in shape, but each has a collar formed thereon adjacent one end for the purpose of abutting the outer surface of the end portion 3. After the trunnions 11 are press-fitted into the apertures 9, they are secured by a weld 13 to end portion 3, thus insuring permanent retention. Surrounding the outer portions of trunnions 11 are roller bearings 15, which consist of a circular series of small diameter rollers rotatably secured in an outer casing 16. The casings 16 for each bearing 15 is press-fittedly secured in a bore provided therefor in a trunnion cap 17. A hardened thrust plug 19 is also press-fittedly secured in a recess provided therefor in each trunnion cap 17. The trunnion caps 17 with the roller bearings 15 and the plugs 19 are assembled over the ends of the trunnions 11 so that the plugs 19 contact the ends of said trunnions. The trunnion caps 17 are seated in aligned apertures 20 in the universal joint housing member 23 and are secured by suitable means, such as bolts 21 engaged in threaded apertures in a member 23 which comprises the outer part of a universal joint housing. Shims 25 are provided between the housing 23 and a flanged portion 26 of each trunnion cap 17, so as to provide for axial adjustment of the caps, thereby positioning the trunnions 11 with respect to the remainder of the axle.

The housing member 23, which in effect is a pivoted wheel-carrying extension of the axle housing 1, comprises essentially two approximately cylindrical portions 27 and 28 joined by a substantially vertical facing 29. The larger cylindrical portion 27 is provided with diametrically opposite apertures 20 into which the afore-described trunnion caps are inserted, and the axis of said cylindrical portion is at an angle with respect to the axis of the cylindrical portion 28. This angularity between the sections of the housing member 23 provides for inclination of the aligned bearing apertures 20 which contributes to ease of steering. A recess or local enlargement 30 in the inner annular wall of the housing portion 27 is provided for a purpose to be later described.

On the outer end of the cylindrical portion 27 and on the outside thereof is formed a groove 31 into which elastically fits one end of a flexible closure boot 32. The other end of this boot elastically fits into a similar groove 33 provided on the outside periphery of the enlarged end portion 3 of the load-carrying member 1. The boot preferably is formed substantially as a rubber sleeve having its ends beaded as shown and of lesser diameters than those of the grooves 31 and 33, so that tight seals and good holding connections will be obtained when the endless beads are permitted to contract into the grooves.

The vertical facing 29 of housing 23 is provided with a circular series of threaded apertures 34 which are adapted to receive bolts 35 provided for clamping a brake mounting member 37 thereto. It is understood that any type of brake may be used so that it is not necessary to describe the particular type herein disclosed.

The smaller cylindrical portion 28 of the housing member 23 is provided with two internal flanges 39 and 41 which are adapted to act as stops for the outer races of a pair of wheel bearings 43 and 45 respectively. The bore into which the outer race of bearing 43 is pressed is extended so as to act as a wiping member for a dust and oil sealing assembly 46.

The road wheel is driven by power supplied through a drive shaft 47 which runs freely in the load-carrying member 1 and derives its power from the axle driving gearing hereinbefore mentioned. The outer end of said shaft 47 connects with a universal joint 49 which operates a short wheel driving shaft 51. Abutting the outer portion of the universal joint 49 and on the outer diameter of shaft 51 is a bearing adapter 53 upon which is mounted the inner race and roller assembly of the wheel bearing 45. The outer end of the shaft 51 has a series of longitudinal splines 55 and on the extreme outer end and adjacent said splines is a threaded portion 57 of reduced diameter. Non-rotatably connected by means of the splines 55 to shaft 51 is a wheel driving member 59. Said wheel driving member 59 is removably secured to the shaft 51 by means of lock nut assembly 61 mounted on the threaded portion 57. It is to be noted that the member 59 has an extended cylindrical hub portion 63, whose internal diameter is substantially the same as the diameter of the portion of the shaft 51 which rather snugly receives the adapter 53. The portion of shaft 51 adjacent the splines 55 is smaller in diameter than that portion which receives the adapter 53. It will be seen from the description immediately foregoing that the member 59 has great stability by reason of its spaced points of support on the splined portion of the shaft and on the portion of larger diameter.

The member 59 is provided at its splined end with an outwardly projecting annular flange 65 having a circular series of apertures therethrough for the insertion of wheel and brake drum securing bolts 67. A combination oil baffle and brake drum 69 is mounted on the inner side of flange 65 of the member 59 and is piloted on the outer periphery of said flange by means of an annular locating shoulder 70. The inner or oil baffle portion 71 of the brake drum 69 is somewhat cup-shaped and is designed to catch any oil which may leak through the oil seal 46. Any oil caught in this manner will be thrown outwardly through radial slots 72 provided therefor in flange 65, so that any oil leakage will be kept out of the brake.

A conventional wheel and tire assembly 73 is mounted upon the outer side of flange 65 and is retained thereon by means of wheel nuts 74. A hub cap 75 is provided on the outer end of the member 59 and is retained thereon by means of screws 77 inserted through suitable apertures provided therefor in the hub cap and into threaded apertures in suitable bosses 78 projecting outwardly from said member 59.

Adjacent the projected cylindrical portion 63 of member 59 is an annular surface 79 of increased diameter upon which is seated the inner race and roller assembly of the wheel bearing 43. A second surface 80 of increased diameter provides a seat upon which is mounted the oil seal assembly 46. Any oil seal having the desired characteristics and dimensions may be used. The particular seal illustrated comprises an inner circular member 81 of L-shaped cross section pressed onto the surface 80 of increased diameter and a circular packing member 82 resting against the radial portion of said L-section and contacting the interior of the small cylindrical portion 28 of the housing 23. The packing 82 is retained against the inner periphery of the member 28 by means of a circular stamping 83 of L-section, the annular part of which is pressed upon the annular part of the member 81.

Referring now to Figure 2, in order that assembly of the essential or foundation parts described can be accomplished without removable trunnions, it is necessary that the housing member 23 be tilted so that one of the trunnions 11 projects into one of the apertures 20 provided for the insertion of trunnion caps 17, whereupon the housing member 23 can then be tilted and moved vertically to bring the other trunnion 11 into the other trunnion cap aperture. The previously described recess 30 permits the rim of the housing portion 27 to clear the top trunnion 11. In order to permit such tilting and vertical movement of housing 23, it is necessary that the inner race and roller assembly of the bearing 45 be temporarily disposed inwardly with respect to its normal running position. As the shaft 51 is flexibly supported by the joint 49, its end may be dropped if necessary when the tilted housing part 23 is brought to a position to introduce the trunnion 11 into the aperture 20. It may or may not be necessary to drop the outer end of shaft 51 sufficiently to clear the upper side of the member 23, depending upon the lengths of the shaft and the portion 28 and, particularly, upon their relative lengths. During the assembling or dismantling operations, the inward spacing of the roller assembly of bearing 45 with respect to its seat and outer race is accomplished by moving the universal joint 49 inwardly. It is to permit this inward movement of universal joint 49 that the double spherical portions 5 and 7 are provided in the interior of enlarged housing portion 3. It is evident that a single substantially parabolic portion could be provided in place of the dual spherical portions 5 and 7, if desired.

Figure 2 clearly illustrates the ease with which housing 23 may be assembled when the shaft 51, the universal joint 49 and shaft 47 are moved inwardly with respect to their normal running position. After housing 23 is oscillated from its tilted position so that trunnions 11 are inserted into the trunnion cap apertures 20, the trunnion caps 17 with their bearings and thrust plugs 19 may then be assembled, and the proper end of the elastic boot 32 snapped into the groove 31.

Next, the shaft 51 is drawn outwardly and the member 59 inserted over shaft 51 which, together with the bearing 45 and its adapter 53, the universal joint 49 and the shaft 47 may then be pulled fully outwardly into their normal running position and held there by the nut assembly 61. The hub cap 75 may now be secured in place.

It is evident from the foregoing description that the present invention provides an improved construction of steering drive axle in which longitudinal displacement of the universal joints and drive shafts is provided for and that such provision together with a greatly simplified wheel hub and bearing construction in combination with a one-piece outer universal joint housing provide for ready assembly and disassembly of the parts.

It should be observed that adequate top and bottom clearances between the housing members 3 and 27, as provided by the enlarged opening 30, is an important feature of this invention as can readily be seen by reference to Figure 2, and this is in great part made possible by the use of the elongated cups carried by the caps 17 and housing the needle-like roller bearings 15.

Other types of universal joints may be utilized, and it will further be obvious that movement of the joint inwardly, to facilitate the above described operations, may be permitted by a sliding connection between the shaft 47 and the joint itself instead of by sliding the inner end of shaft 47 with respect to the differential. Furthermore, by making the shaft 47 completely detachable inwardly from the universal joint it would be possible to apply and remove the entire wheel assembly (except for the trunnion caps and bearings) as a unit, for the shaft 47 then would not interfere with vertical movement of the outer housing member 23 even though the bearing 45 had not been removed from its seat. The illustrated form, however, with the adjacent ends of shafts 47 and 51 positively coupled by the universal joint against axial movement, is preferable for present commercial use, as otherwise the conventional axle or its differential would have to be modified to prevent an undesirable floating movement of shaft 47 or its complete disengagement from the joint in normal operation.

The features of the present invention obviously are applicable to a reversed arrangement of universal joint housing members, where the member of smaller diameter is supported by the wheel assembly and the larger member is secured to the axle 1.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the range of equivalency of the claims are therefore intended to be embraced therein.

What is claimed and desired to be secured by United States Letters Patent is:—

1. In a steering wheel drive, a stationary axle and a universal joint housing part of rigidly combined construction, a second housing part adapted to nest with the first housing part, pivot means carried by one of said parts for pivotally interconnecting said housing parts, wheel driving shafts, a universal joint flexibly connecting said shafts and housed within said pivotally connected housing parts, a recess in the first mentioned housing part permitting said universal joint to be shifted axially relative to said first mentioned housing part and an opening in the second mentioned housing part permitting said housing parts to be assembled and disassembled while said pivot means is in position.

2. In a steering wheel drive, an outer universal joint housing member, a hollow wheel spindle secured to said housing member, an inner universal joint housing member, pivot means for interconnecting said housing members, a universal joint and a shaft for driving said universal joint, a shaft driven from said universal joint and extending into said wheel spindle, a bearing seat in said spindle for rotatably supporting said driven shaft, said inner housing member being formed to permit axial movement of said universal joint and said driven shaft axially in a direction away from said spindle whereby to remove said shaft inwardly from said supporting seat and permit axial displacement of said housing parts during assembly and disassembly thereof.

3. In a steering wheel drive, an inner open ended universal joint housing, an outer housing adapted to surround said first named housing, axially aligned trunnions secured to one of said housings, aligned bearing receiving apertures in the other housing, bearing assemblies positioned in said apertures into which said trunnions extend, a universal joint located within said housings, a shaft for driving said universal joint, a wheel driving shaft driven from said universal joint, said universal joint and said shafts being capable of axial movement and means to restrain said shafts and universal joint against axial movement, a recess in one of said housings to receive said joint upon axial movement thereof after disconnection of said restraining means whereby to permit relative lateral movement of said pivotally connected housings upon removal of said bearing assemblies, the relative lateral movement of said housings allowing them to be separated without removal of said trunnions.

4. In a steering drive axle, an axle shaft, a wheel driving shaft, a universal joint flexibly connecting said shafts, a housing for said universal joint comprising a stationary housing part and another housing part pivotally connected thereto, a wheel supporting spindle integral with said pivoted housing part and surrounding said wheel driving shaft, a hollow wheel driving member surrounding said wheel driving shaft within said spindle, a spline connection between said wheel driving member and said wheel driving shaft, bearings within said spindle rotatably supporting said wheel driving shaft and said wheel driving member, means on said wheel driving member for receiving a supporting road wheel, said wheel driving shaft and said spindle being of such lengths and so related as to preclude complete separation of said housing parts when said universal joint is in operative position relative to said housing, and means permitting said universal joint and said wheel driving shaft to be shifted axially a sufficient extent with respect to said stationary housing part to permit ready removal of the second mentioned housing part after prior removal of said wheel supporting means.

5. In a steering wheel drive, a stationary axle and a universal joint housing member of rigidly combined construction; a hollow wheel supporting spindle and a second universal joint housing member of rigidly combined construction; aligned trunnions secured to one of said housing members and extending into bearing apertures in the other housing member; a combined hub and wheel mounting member having a hollow internally splined hub part and a radial wheel supporting flange; a universal joint within the associated housing members; a wheel driving shaft operatively secured to said universal joint and having a splined end received in said internally splined hub part; a bearing in said spindle for rotatably supporting said hub part therein and removable from said spindle with said hub part; a second bearing in said spindle for rotatably supporting said shaft; said universal joint and said shaft being axially shiftable in said housing members sufficiently to cause said second-named bearing to be removed from said spindle, whereby to permit one of said housings to be laterally displaced with respect to the other to facilitate assembling and dismantling the assembly without removal of said trunnions.

6. In a driven axle construction, a brake drum, a wheel driving member disposed axially of said drum and having a flange thereon to receive and secure a supporting vehicle wheel and said brake drum, an axle sleeve surrounding said member and terminating at one end adjacent said flange, a lubricated bearing between said driving member and said sleeve, said brake drum and said flange having means cooperating with said one end of said sleeve to divert escaping lubricant from the interior of said brake drum.

7. In a driven axle construction, a brake drum, a wheel driving member provided with a radial flange adapted to receive a supporting vehicle wheel and said brake drum, means to secure said wheel and drum to said flange, a sleeve surrounding said member adjacent said flange, said flange having an annular recess receiving the outer end of said sleeve, a lubricated bearing between said driving member and said sleeve, an annular projection on said brake drum forming an annular recess in communication with the first mentioned recess for receiving lubricant escaping from said bearing, and a substantially radial passageway formed between said drum and said flange and communicating with said recess and serving to drain lubricant therefrom.

8. A steered driven wheel and axle assembly comprising, in combination, an axle housing section terminating at its outer end in a flared enlargement, and a complemental housing section terminating at its inner end in a flared enlargement concentrically overlapping said first-mentioned enlargement; a pair of diametrically opposed trunnions provided on the inner one of said enlargements and extending outwardly into the other to afford a pivotal connection for steering; detachable cap structures secured in abutment with the outer ends of said trunnions; a wheel assembly surrounding said complemental section and rotatable with respect thereto; driving means comprising a pair of rotatable shaft sections disposed within said housing sections and interconnected by a universal joint centered within said overlapped enlargements, one of said shaft sections being in driving engagement with the wheel assembly and the other being designed for connection to a power source; and said enlargements being so shaped and related that said universal joint may be shifted axially and that, upon removal of said detachable cap structures said enlargements may be relatively moved vertically and thereafter tilted relatively to permit removal of said complemental housing section while said trunnions remain as a rigid part of the enlargement which carries the same.

9. In a dirigible wheel drive construction, an axle housing section terminating at its outer end in a flared enlargement, and a complemental housing section terminating at its inner end in a flared enlargement concentrically overlapping said first-mentioned enlargement; a pair of diametrically opposed trunnions provided on the inner one of said enlargements and extending outwardly into the other to afford a pivotal connection for steering; a wheel assembly surrounding said complemental section and rotatable with respect thereto; driving means comprising a pair of rotatable shaft sections disposed within said housing sections and interconnected by a universal joint located within said overlapped enlargements, one of said shaft sections having a bearinged support within said complemental housing section and having an axially slidable connection with said wheel assembly, and the other being designed for connection to a power source; and said enlargements being shaped to permit said universal joint to be shifted axially inwardly sufficiently to disrupt said bearinged support prior to separation of said enlargements when dismantling the apparatus.

HERBERT W. ALDEN.